3,658,922
PREPARATION OF NITROOLEFINS IN THE PRESENCE OF ETHER SOLVENTS
Charles A. Drake, Bartlesville, Okla., assignor to Phillips Petroleum Company
No Drawing. Filed Apr. 23, 1970, Ser. No. 31,376
Int. Cl. C07c 79/06
U.S. Cl. 260—644      6 Claims

ABSTRACT OF THE DISCLOSURE

A method of preparing nitroolefins by contacting olefins with nitric oxide in the presence of an ether solvent without the formation of significant amounts of nitroalcohols, nitroso-nitro or dinitro compounds.

---

This invention relates to a method of reacting olefins with nitric oxide in the presence of an ether solvent. In another aspect this invention relates to the preparation of nitroolefins.

Nitroolefins have been prepared by various methods known in the art including complex catalyst nitration processes as well as the direct nitration of olefins with nitric oxide. The nitration of olefins with nitric oxide has involved a multitude of reaction conditions. Exemplary of these conditions have been acid mediums under blended atmospheres of nitric oxide, nitrogen dioxide, nitrogen trioxide, and nitrogen pentoxide. Other variables such as temperature and pressure have also been applied without producing improved results. The methods known by the art are not satisfactory due to poor yields and side production of unwanted nitroalcohols, nitroso-nitro and dinitro compounds.

An object of this invention is to provide an improved process for producing nitroolefins.

A further object of this invention is to provide an improved process for preparing nitroolefins without the formation of significant amounts of nitroalcohols, nitroso-nitro or dinitro compounds.

I have discovered a method of preparing nitroolefins by allowing olefins to react with nitric oxide in the presence of an ether solvent. I have discovered a method for producing nitroolefins without the formation of nitroalcohols, nitroso-nitro or dinitro compounds. The method of my invention is applicable to olefins within the 2 to 20 carbon atoms per molecule range and is of particular interest since its constitutes a single stage process. Nitration reactions carried out in accordance with my invention are not limited as to temperature or pressure except to the extent that optimum conditions may be established for any particular reagent or reagent-solvent relationship used.

In a closer examination of my invention, a stirred pressure reactor is charged with a solution comprising olefins having from 2 to 20 carbon atoms per molecule and an ether solvent. The reactor is then purged with nitrogen and flushed with nitric oxide before pressurization with nitric oxide to a predetermined pressure, range for example, from 75 to 300 p.s.i.g., at a temperature range of 10 to 60° C. The reaction can be repressurized with nitric oxide to the original pressure level. The repressurizing process may be repeated several times in order to improve the nitroolefin yield. The resulting nitroolefins are then removed from the pressure reactor and recovered by distillation or other suitable means. The nitroolefins prepared by the method of my invention are an important class of chemical intermediates for conversion to amines, for example, and other related compounds.

Suitable ether solvents which can be utilized by the method of my invention include the following: 1,4-dioxane, 1,3-dioxane, tetrahydrofuran, 2,5-dimethoxytetrahydrofuran, 4-fluorotetrahydrofuran, and 2-ethyl-1,4-dioxane.

The following examples are submitted in order to illustrate but not to limit the invention.

EXAMPLE I

Reaction of 1-octene and nitric oxide in dioxane

A solution comprising 5.0 g. of 1-octene and 50 ml. of dioxane was placed in a pressure reactor, the reactor was purged with nitrogen, and then pressured with nitric oxide to afford 200 p.s.i.g. at 45–50° C. After about 30 minutes, the gases were vented and the reactor was repressurized with 200 p.s.i.g. of nitric oxide. A 30-minute reaction period was allowed before the nitric oxide pressure was vented from the reactor and the product mixture was concentrated through a rotary evaporator means to afford 8.7 grams of liquid residue. Analysis (v.p.c.) indicated a 4.6 g. (66% by weight) yield of 1-nitro-1-octene without formation of nitroalcohol or solid dimer byproducts.

EXAMPLE II

Reaction of 1-octene and nitric oxide in diethyl ether

A solution comprising 5.0 g. of 1-octene and 50 ml. of diethyl ether was placed in a pressure reactor, the reactor was purged with nitrogen, and then pressured to afford 180 p.s.i.g. nitric oxide atmosphere at 45–50° C. After about 35 minutes, the reactor was vented and repressured with nitric oxide to a 180 p.s.i.g. pressure. After a total 70-minute reaction period, the product mixture was concentrated by a rotary evaporator means leaving 7.1 grams of liquid residue. Analysis (v.p.c.) indicated at 2.6 g. (37% by weight) yield of 1-nitro-1-octene. No solid byproducts were observed.

EXAMPLE III

Reaction of cyclohexene and nitric oxide in tetrahydrofuran

A solution comprising 5.0 g. of cyclohexene in 50 ml. of tetrahydrofuran was placed in a pressure reactor, the reactor was purged with nitrogen and then pressurized to afford a 200 p.s.i.g. nitric oxide atmosphere at 45–50° C. These conditions were maintained for a 90-minute period. After the 90-minute period the reactor was vented and the product mixture concentrated through a rotary evaporator means to afford 8.0 g. of liquid residue. Analysis (v.p.c.) indicated a 1.6 g. (21% by weight) yield of 1-nitro-1-cyclohexene.

EXAMPLE IV

Reaction of 1-octene and nitric oxide in tetrahydrofuran

A solution comprising 5 g. of 1-octene in 50 ml. of tetrahydrofuran was placed in a pressure reactor, the reactor was then purged with nitrogen and flushed with nitric oxide. The pressure reactor was then pressurized with nitric oxide to a pressure of 200 p.s.i.g. at a temperature range of 45–50° C. for approximately 40 minutes during which time the reactor was repressurized 4 times at equal intervals of about 10 minutes each. The reactants were removed from the pressure reactor and separation was achieved through a rotary evaporator means, yielding at least 66% by weight nitroolefin without the production of any noticeable-nitroso dimers of 1-octene.

The above examples, I through IV, illustrate that the reaction of 1-octene proceeds satisfactorily in dioxane as well as it does in tetrahydrofuran with both yielding approximately 66% by weight yields, but only yielded a 37% by weight nitroolefin yield when using diethyl ether.

The examples also illustrated that cyclohexene in tetrahydrofuran produced even a lower yield of only 21% by weight nitroolefin. As illustrated by the 4 examples above, the preferred reaction-method of my invention employs acyclic olefins and cyclic ethers. Cyclic olefins and linear ethers are operable according to the method of my invention as starting materials and solvents but afforded lower yields of nitroolefins than did the acylic olefin-cyclic ether combinations.

Table I, below, is a summation of the results achieved by the preceding four examples. Example II illustrates the importance of selecting the proper ether solvent, for example, the linear ether diethyl ether afforded lower yields of nitroolefin than did the cyclic ethers whene contacted with the same acyclić olefin. The results, as shown in Table I, also illustrate the poor results of utilizing a cyclic olefin with a preferred cyclic ether as shown by the lowest weight percent yield of nitroolefin.

TABLE I

| Solvent | Olefin | Temperature, °C. | Time, minutes | Initial pressure, p.s.i.g. | Yield nitroolefins, weight percent | By-product, weight percent |
|---|---|---|---|---|---|---|
| Example: | | | | | | |
| I........ Dioxane............ | 1-octene....... | 45-50 | 30 | 200 | 66 | None noted. |
| II....... Diethyl ether........ | do......... | 45-50 | 70 | 180 | 37 | Do. |
| III...... Tetrahydrofuran.... | Cyclohexene.. | 45-50 | 90 | 200 | 21 | Do. |
| IV.............do............. | 1-octene....... | 45-50 | 40 | 200 | 66 | Do. |

The nitration of olefins with nitric oxide may be carried out at various temperature ranges but the best results were realized within the more restrictive range of 10–60° C.

In practice it is convenient to charge the reactor with the olefin solution and then to inject nitric oxide to a predetermined pressure. The reaction mixture is then controlled at a selected temperature range for the reaction and the pressure within the system maintained by periodic injections of nitric oxide. As a rule, the pressures used will range from 75 to 350 p.s.i.g.

The cyclic ethers tetrahydrofuran and dioxane are the preferred solvent media because of the correspondingly high percent by weight yields achieved without the production of undesired by-products characterized by media reactions of the art. The amount of solvent medium used is not critical and it can be varied over wide limits.

The nitric oxide used in the process of this invention should be of a high degree of purity. That is, it should not contain any sensible amounts of other oxides of nitrogen in order to avoid complicating side reactions, for example, oxidation, which operate to decrease the yield of desired nitroolefins.

1-octene was chosen as a typical representative olefin selected from those olefins having 2 to 20 carbon atoms per molecule which are included as reactants in this invention. Suitable olefins within the range of 2 to 20 carbon atoms per molecule include, for example, ethylene, propylene, butene-1, butene-2, hexene-1, heptene-1, octene-1, cyclohexene, cyclopentene, decene, octadecene, eicosene, 3 - methyl-pentene - 1, 4-methyl-pentene-1, 2,3-dimethylhexene-1, and methylcyclohexane. Mixtures of these olefins may be used as a feed for my invention, and are available, for example, in most refinery operations.

It is to be understood that this invention is not limited to the specific examples, which have been offered merely as illustrations, and that modification may be made without departing from the spirit of this invention.

What I claim is:

1. A method of preparing nitroolefins comprising; contacting at least one olefin having 2 to 20 carbon atoms per molecule with nitric oxide in the presence of an ether solvent having from 4 to 20 carbon atoms per molecule under a substantially oxygen-free atmosphere.

2. A method according to claim 1 wherein said ether solvent is a cyclic ether having from 4 to 20 carbon atoms per molecule.

3. A method according to claim 2 wherein the cyclic ether solvent having from 4 to 20 carbon atoms per molecule is dioxane.

4. A method according to claim 2 wherein the cyclic ether solvent having from 4 to 20 carbon atoms per molecule is tetrahydrofuran.

5. A method acording to claim 1 wherein the olefin is an acyclic olefin and said contacting occurs at a temperature range of from 10 to 60° C. under a nitric oxide pressure of from 75 to 300 p.s.i.g.

6. A method according to claim 5 wherein the acyclic olefin of from 2 to 20 carbon atoms per molecule is 1-octene.

References Cited
UNITED STATES PATENTS

| | | | |
|---|---|---|---|
| 2,656,395 | 10/1953 | Benson | 260—644 |
| 2,776,190 | 1/1957 | Mantell et al. | 23—190 |
| 2,867,669 | 1/1959 | Burkhard et al. | 260—644 |

OTHER REFERENCES

Levy et al., J. Chem. Soc. (London), pp. 52–60 (1948).

LELAND A. SEBASTIAN, Primary Examiner

U.S. Cl. X.R.

260—688